(12) United States Patent
Mueller

(10) Patent No.: US 11,602,144 B2
(45) Date of Patent: Mar. 14, 2023

(54) SYSTEM AND METHOD FOR RETROFITTING RODENT TRAPS FOR REMOTE MONITORING

(71) Applicant: Fumigation Service & Supply, Inc., Westfield, IN (US)

(72) Inventor: Peter Joseph Mueller, Noblesville, IN (US)

(73) Assignee: Fumigation Service & Supply, Inc., Westfield, IN (US)

( * ) Notice: Subject to any disclaimer, the term of this patent is extended or adjusted under 35 U.S.C. 154(b) by 92 days.

(21) Appl. No.: 17/235,632

(22) Filed: Apr. 20, 2021

(65) Prior Publication Data

US 2022/0330540 A1 Oct. 20, 2022

(51) Int. Cl.
*A01M 23/38* (2006.01)
*A01M 23/16* (2006.01)

(52) U.S. Cl.
CPC ............ *A01M 23/38* (2013.01); *A01M 23/16* (2013.01)

(58) Field of Classification Search
CPC ...... A01M 23/38; A01M 23/16; A01M 23/00; A01M 23/02; A01M 23/08; A01M 23/10; A01M 23/14; A01M 23/18
USPC .............................. 43/58, 60, 61–67, 73, 74
See application file for complete search history.

(56) References Cited

U.S. PATENT DOCUMENTS

| | | | | |
|---|---|---|---|---|
| 3,786,591 A | * | 1/1974 | Morford | A01M 23/08 43/66 |
| 4,103,448 A | * | 8/1978 | Souza | A01M 23/08 43/67 |
| 6,631,582 B2 | * | 10/2003 | Knuppel | A01M 23/12 43/64 |
| 6,691,452 B1 | * | 2/2004 | Knuppel | A01M 23/04 43/64 |
| 6,735,899 B1 | * | 5/2004 | Anderson | A01M 23/04 43/98 |

(Continued)

FOREIGN PATENT DOCUMENTS

| | | | | |
|---|---|---|---|---|
| EP | 3082412 B1 | * | 5/2018 | ............ A01M 23/20 |
| GB | 2521399 A | * | 6/2015 | ............ A01M 23/20 |
| GB | 2551053 A | * | 12/2017 | ............... G01D 5/24 |

OTHER PUBLICATIONS

Rodent Monitoring System (RMS) Bayer CropScience LP, 5000 CentreGreen Way, Suite 400, Cary, NC 27513 [Retrieved online Mar. 23, 2021 from https://www.environmentalscience.bayer.us/pest-management-and-public-health/business-assurance/digital-pest-management/how-it-works].

(Continued)

*Primary Examiner* — Timothy D Collins
*Assistant Examiner* — Maria E Graber
(74) *Attorney, Agent, or Firm* — Woodard Emhardt Henry Reeves & Wagner, LLP

(57) ABSTRACT

A method for converting a conventional manually monitored capture-and-release rodent trap of a type having a box-shaped container with opposed one-way entry corridors communicating with a capture chamber into a remotely-monitored rodent trap. In one aspect, the method includes attaching a smart-sensor to the lid of the trap and press-fitting a bracket having a rodent opening into the space between the one-way entry corridors such that the rodent opening in the bracket restricts movement of a rodent into the capture chamber to a pathway in sufficient proximity for detection by the smart-sensor and signaling to a remote monitoring location.

3 Claims, 7 Drawing Sheets

(56) References Cited

U.S. PATENT DOCUMENTS

| | | | | |
|---|---|---|---|---|
| 6,955,007 | B2* | 10/2005 | Gehret | A01M 23/06 |
| | | | | 43/61 |
| 7,317,399 | B2* | 1/2008 | Chyun | A01M 1/026 |
| | | | | 43/132.1 |
| 2003/0150152 | A1* | 8/2003 | Gehret | A01M 23/04 |
| | | | | 43/61 |
| 2003/0213161 | A1* | 11/2003 | Gardner, Jr. | A01M 31/002 |
| | | | | 43/114 |
| 2005/0151653 | A1* | 7/2005 | Chan | A01M 31/002 |
| | | | | 340/573.2 |
| 2011/0109460 | A1* | 5/2011 | Lloyd | A01M 31/002 |
| | | | | 340/573.2 |
| 2018/0249696 | A1* | 9/2018 | Daly, Jr. | A01M 31/002 |
| 2019/0037829 | A1* | 2/2019 | Laut | H01H 1/242 |
| 2020/0060256 | A9 | 2/2020 | Laut et al. | |
| 2021/0076663 | A1* | 3/2021 | Chisholm | A01M 23/38 |
| 2021/0185998 | A1* | 6/2021 | Siler | A01M 23/38 |

OTHER PUBLICATIONS

JT Eaton Co., Inc., 1393 East Highland Rd., Twinsburg, OH 44087, USA Repeater Multiple Catch Mouse Trap W/Clear Window [Retrieved online Apr. 20, 2021 from https://www.jteaton.com/product/repeater-multiple-catch-mouse-trap-wclear-cover/ ].

Woodstream Corporation, 29 E. King Street, Lancaster, PA 17602, Victor Smart-Kill Wi-Fi Electronic Rat Trap M2, Victorpest.com [Retrieved Apr. 20, 2021 from https://www.victorpest.com/smart-kill-electronic-rat-trap-m2].

* cited by examiner

SYSTEM AND METHOD FOR RETROFITTING RODENT TRAPS FOR REMOTE MONITORING

BACKGROUND

The present disclosure relates generally to rodent management systems for controlling infestations of rodents such as mice and the like. Particularly in the case of large commercial and industrial establishments where food processing and/or storage occurs, there is a need to keep vigilant for any possible rodent infestation. As a result, such establishments often have a series of mousetraps positioned in various locations throughout the facility, which are monitored on a daily basis. In recent times, it has become more and more popular to use traps of the humane capture type that are able to capture mice without significant injury so that they may be released live to a suitable outdoor environment rather than left in the traps to die. Thus, frequent monitoring of the traps is needed to ensure that mice do not die in the traps based on prolonged capture conditions. Monitoring can be labor intensive and time consuming, especially if all traps need to be physically inspected whether or not they actually contain any trapped mice. The labor costs for monitoring can be very expensive, especially when there are a significant number of traps spaced around a very large site.

In order to cut down on these labor costs, wireless electronic smart-sensor traps have been developed which provide the ability to do remote monitoring of the traps. These smart-sensor traps detect movement of a captured mouse and remotely notify the service person in real-time of the activity. One such trap is known as "Victor® M2 Smart-Kill Wi-Fi Enabled Indoor Electronic Rat Trap" marketed by Woodstream located in Lancaster, Pa. These traps cut down on the labor time involved in the physical inspections of the traps because only those traps that actually contain trapped mice need to be physically visited by the service person. Unfortunately, converting facilities from an existing manual labor intensive monitoring program to a more automated program with smart-sensor traps requires the customer or the pest management provider to bear the cost of totally replacing all their existing traps which otherwise may still have had many years of remaining useful service life.

Another remote monitoring rodent trap system, known as the "Bayer (RMS) Rodent Monitoring System" is marketed by Bayer CropScience LP, located in Research Triangle Park, N.C. In addition to providing rodent traps having pre-installed remote monitoring sensors, Bayer offers its RMS system for retrofitting to the customer's existing manually monitored rodent traps. In order to ensure that rodents may be detected by the sensor in retro-fit traps, a divider See, e.g., Bayer's U.S. Patent Application Publication 2020/0060256 which discloses use of a divider 47 (FIGS. 4 I-J) that may be attached to the trap entrance using a variety of fasteners such as "nails, screws, pins, glues, pastes, Velcro snaps, magnets, etc." [0074]. While this divider helps to ensure that rodents may be detected by the sensor in retro-fit traps, the installation process is complicated by the use additional fastener hardware, or, in the case of magnets, creates an opportunity the divider will be compromised by the rodent.

Thus, there is a need for improvement in this field.

SUMMARY

The present disclosure pertains generally to rodent management systems for controlling infestations of rodents such as mice and the like. In certain aspects, the present disclosure provides a method of converting a conventional manually monitored capture-and-release rodent trap into a remotely-monitored rodent trap. In at least one aspect, the conversion method comprises the steps of: providing a conventional manually monitored capture-and-release rodent trap having a box-shaped container with opposed one-way entry corridors communicating with a capture chamber and a removable lid for accessing the capture chamber; providing a smart-sensor for remotely monitoring the presence of one or more rodents inside the capture chamber; providing a bracket having a rodent opening therein for limiting passage through an open space between the one-way entry corridors; attaching the sensor to the rodent trap; and retrofitting the bracket to the rodent trap such that the rodent opening in the bracket restricts movement of a rodent into the capture chamber to a pathway in sufficient proximity for detection by the smart-sensor of the presence of the rodent in the capture chamber.

The bracket can be provided with a downwardly extending lip and the attaching step can be accomplished by press-fitting the bracket lip into the space between the opposed one-way entry corridors.

The bracket can be configured to have a one-piece construction and formed of sheet metal steel.

The bracket can be formed of 24 gauge galvanized steel.

The term "capture-and-release rodent trap" as used herein means any conventionally known rodent trap that is designed not to kill or injure the rodent even if it may be modified to do so such as for example by use with a poison, glue strips, and/or so-called "humane" killing devices.

The term "smart-sensor" as used herein means a device that takes input from the physical environment for remote monitoring and uses built-in compute resources to perform predefined functions upon detection of specific input before passing on the detection information to a remote user.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
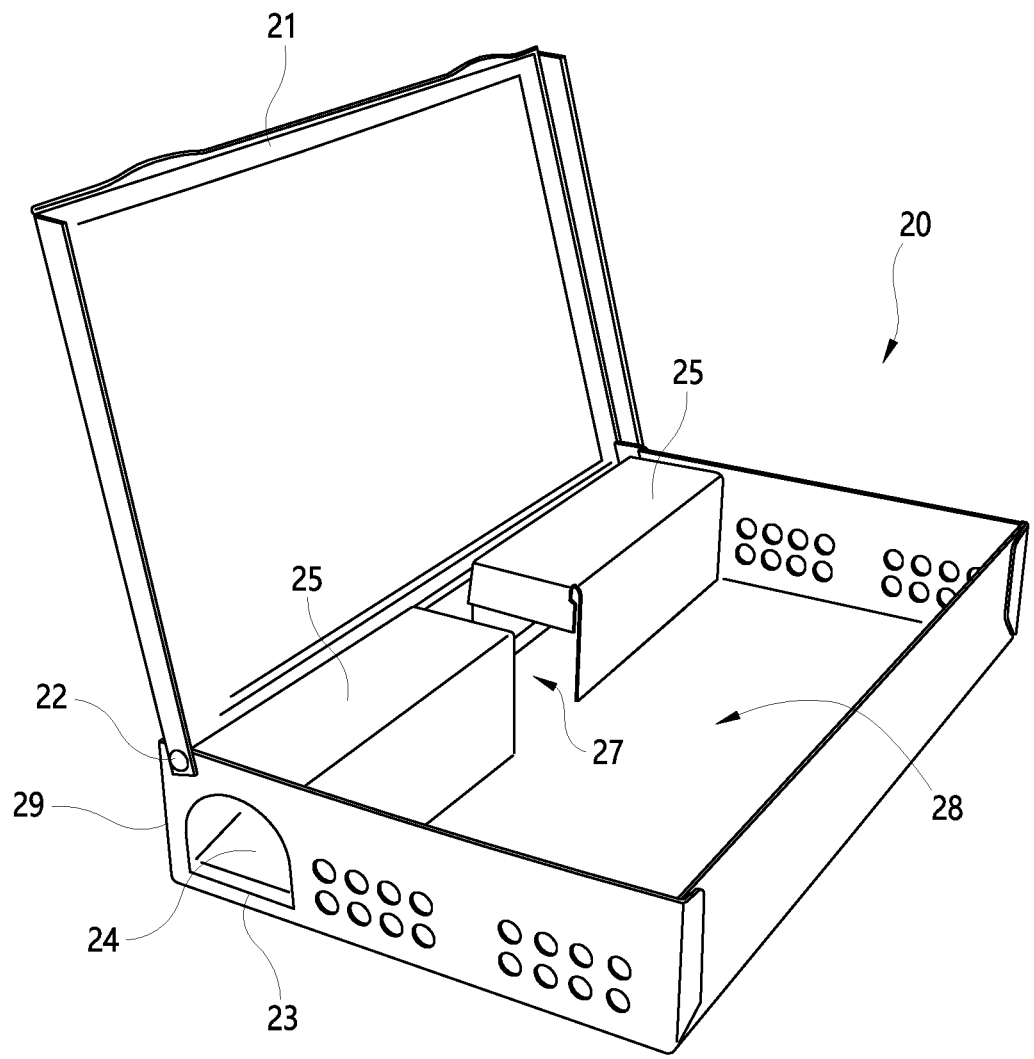
FIG. 1 is a perspective view of a conventional, manually monitored, capture-and-release rodent trap with the lid raised to view the interior.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

As seen in FIG. 1, there is shown a conventional manually monitored, capture-and-release rodent trap 20 of a style particularly popular for use by commercial establishments. Rodent trap 20 is manufactured by multiple manufacturers, one being J.T. Eaton of Twinsburg, Ohio under the trademark "Repeater™". Rodent trap 20 includes a generally rectangular box shaped enclosure having a lid 21, which is pivotally attached thereto at hinge 22. Located on opposed sides of trap 20 towards the rear are two rodent entry passages 23. The entries communicate with one-way corridors 25 having a pivoting ramp 24 that, as a rodent runs along, will tilt the ramp down until it steps off once inside open space 27 between the corridors 25. The ramp 24 then returns to the original position allowing for another rodent to enter but preventing any on the inside from exiting. Space 27 leads to a capture chamber 28 where the rodent is held in confinement until trap 20 is manually inspected. The trap 20 is capable of holding one or more rodents depending on the size of capture chamber 28. As previously noted, although traps of this type are able to trap rodents humanely, that is, without killing or injuring them, it is usually necessary to visit the trap at least daily. Otherwise, any rodents inside the trap may perish due to dehydration, starvation, or other negative consequences due to their confinement. Such routine periodic manual inspections are required even if the trap is empty as there is no means provided for alerting inspection personnel of the trap's status without manual inspection.

Figure 3:
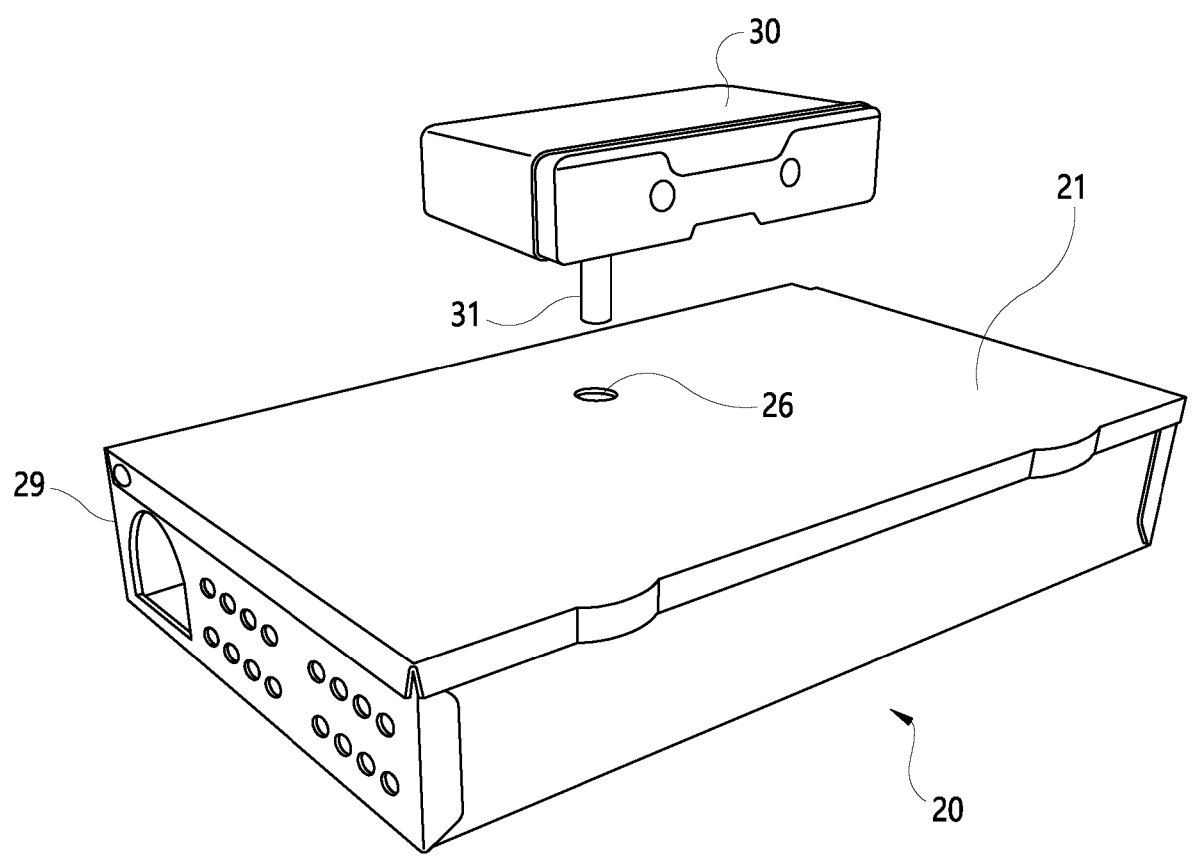
FIG. 3 is a perspective view of the manually monitored rodent trap of FIG. 1 showing a remote monitoring sensor in position for attachment onto the trap lid in accordance with an embodiment of the method of the present invention.

A relatively simple and less expensive way to provide for remote monitoring without replacing traps such as trap 20 is to convert them by attaching a remote monitoring sensor 30 such as seen in FIG. 3. To provide the remote monitoring capability, the sensor 30 may be battery powered and includes wireless transmission capability, such as for example an RF transmitter. Sensor 30 may be any suitable type of proximity sensor such as typically used for detecting the presence of animals. In one embodiment, sensor 30 may be the remote monitoring rodent sensor Model No. IRS v.2.4.10 used in what is known as the Bayer (RMS) Rodent Monitoring System. This system uses an electrical contact sensor attached to a wireless transmission device mounted on the top of the trap with the sensor's detector 31 extending into the capture chamber 28. However, instead of using a divider with physical fasteners, such as screws, nails, etc. to retrofit the capture chamber 28 to ensure rodent detection by the sensor 30, in the subject invention a bracket 10 is provided as more described below to simplify and otherwise provide an improved method of retrofitting a conventional manually monitored rodent trap for remote monitoring purposes.

Figure 2:
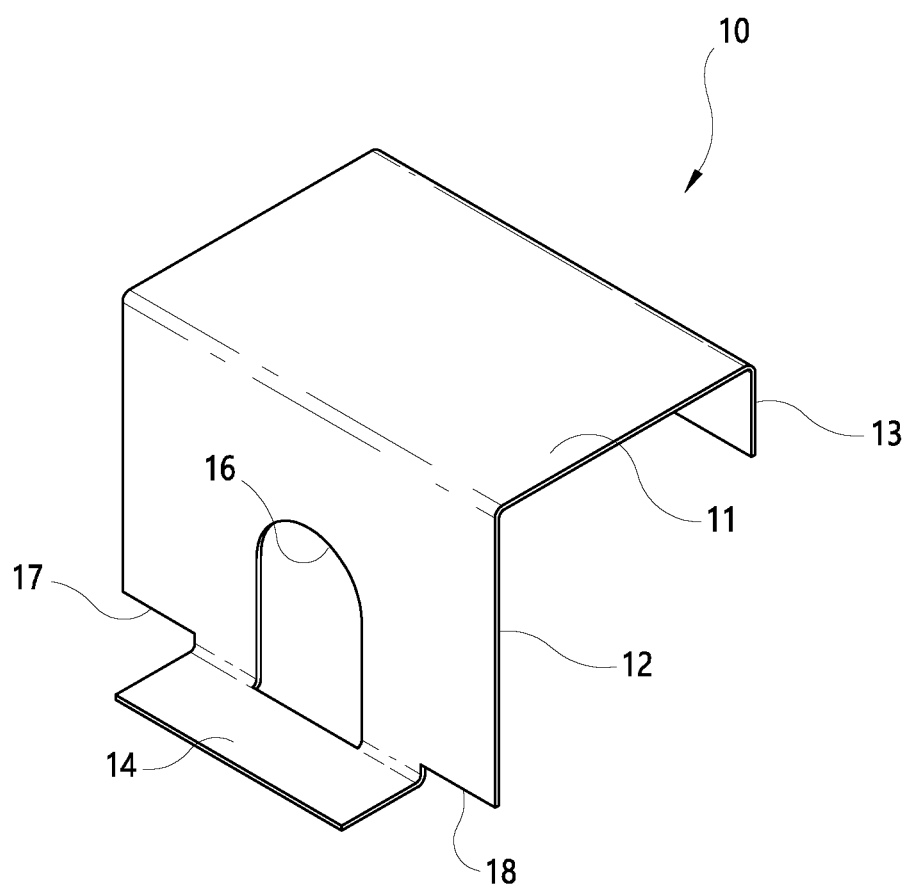
FIG. 2 is a perspective view of the bracket of the present invention.

As shown in FIG. 2, bracket 10 has a one-piece construction of integrally formed planar shaped sections including legs 11 and 12, and lips 13 and 14. Lip 13 extends downwardly at a right angle from the rear of leg 11, while lip 14 extends horizontally from the bottom of leg 12 at a right angle. Leg 12 forms a wall having an opening 16 which is sized and arranged to form an arched shaped passageway entrance to a capture chamber 28 for rodents entering the trap 20 through the one-way corridors 25 as more fully explained later herein. Leg 12 has notches 17 and 18 that provide clearance to facilitate easier installation of bracket 10 into trap 20. Notably, bracket 10 is sized and arranged such that it may be press-fit over the top of the opposed corridors 25, with lip 13 extending downwardly in the somewhat limited space between the rear-facing portion of the corridors 25 and the rear wall 29 of trap 20. This is accomplished by forming bracket 10 in a single-piece construction such that the lip 13 and legs 11 and 12 have dimensions that are closely sized for a press-fit with the associated portions of the corridors 25 of trap 20. In one embodiment, the bracket 10 is formed of 24 gauge sheet metal made of galvanized steel.

Figure 4:
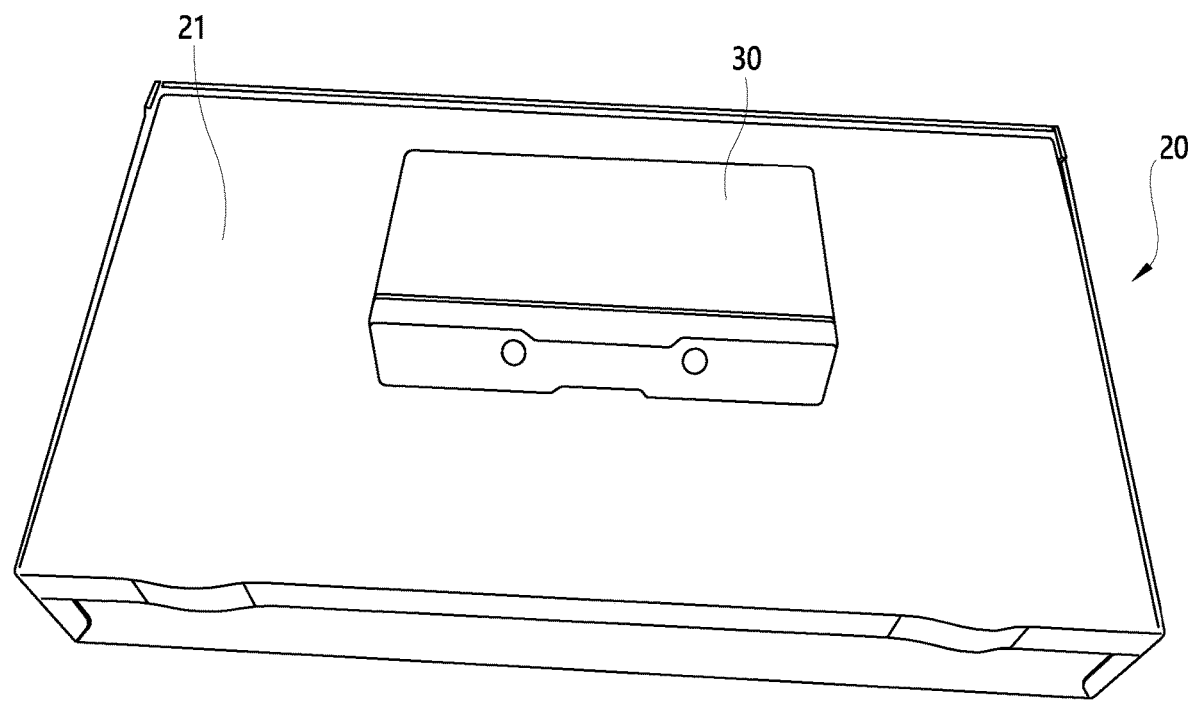
FIG. 4 is a perspective view of the rodent trap of FIG. 1 with the remote monitoring sensor of FIG. 3 installed in accordance with an embodiment of the method of the present invention.
Figure 5:
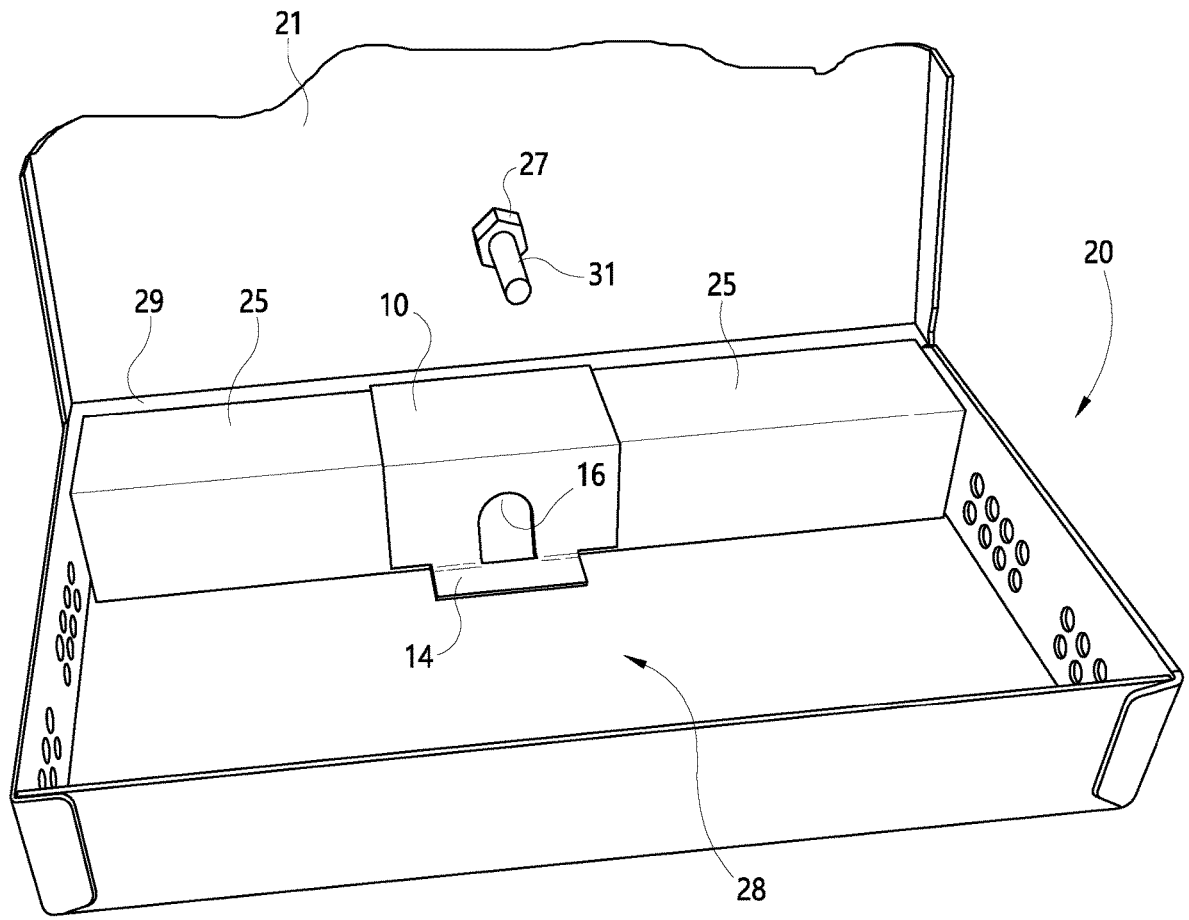
FIG. 5 is a perspective view of the manually monitored rodent trap of FIG. 1 with the bracket of FIG. 2 installed in accordance with an embodiment of the method of the present invention.

FIG. 3-5 show the steps performed in one embodiment of the method of converting the manually monitored rodent trap 20 into a remotely monitored rodent trap. With reference to FIG. 3, a hole 26 is formed in the lid 21 of trap 20 at a location directly above where the detector 31 of sensor 30 is to be positioned inside capture chamber 28. Hole 26 is sized to receive therethrough detector 31 and may be formed by any suitable technique such as punching, cutting, drilling, etc. Once the hole 26 is formed, the detector 31 is extended through it and is secured to lid 21 by a nut fastener 27 so that the sensor 30 is attached securely on the top of lid 21 (FIG. 4). Next, bracket 10 is retrofitted onto the trap 20 by press-fitting it over the opposed corridors 25 so that the lip 13 of bracket 10 is fitting snugly into the space between the corridors 25 and the rear wall 29 of the trap 20. Preferably, the bracket 10 should attach over the top of corridors 25 in a tight, friction fit with the lip 14 of bracket 10 residing proximate the floor of capture chamber 28, and the passageway opening 16 centered between the corridors 25. With bracket 10 and sensor 30 so positioned and attached to trap 20, the opening 16 in bracket 10 restricts movement of a rodent entering into the capture chamber to a pathway in sufficient proximity for detection by the detector 31 of the presence of a rodent entering the capture chamber. Thus, the heretofore manually monitored rodent trap 20 is now converted for reliable use as a remotely monitored rodent trap as part of an integrated remotely monitored rodent trap system 40 as will be described later with reference to FIG. 9.

Figure 7:
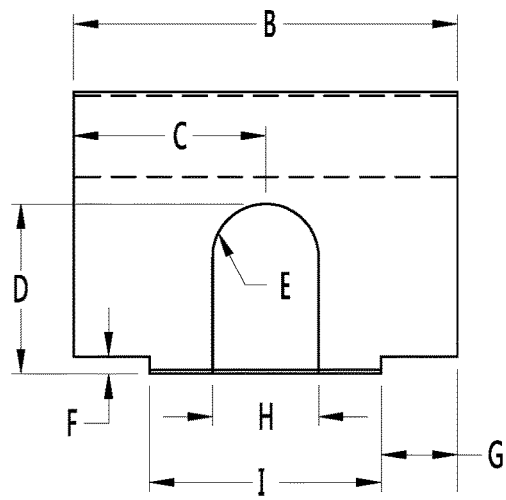
FIG. 7 is a front view of the bracket of FIG. 2.
Figure 6:
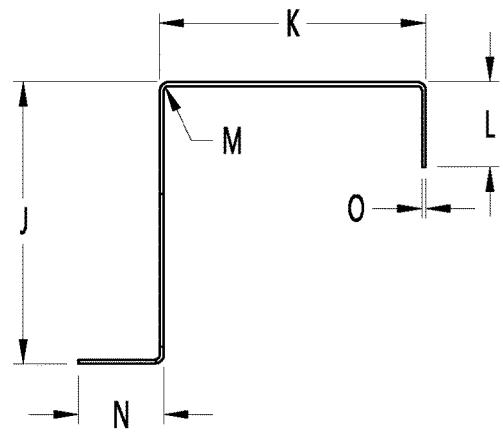
FIG. 6 is a side view of the bracket of FIG. 2.
Figure 8:
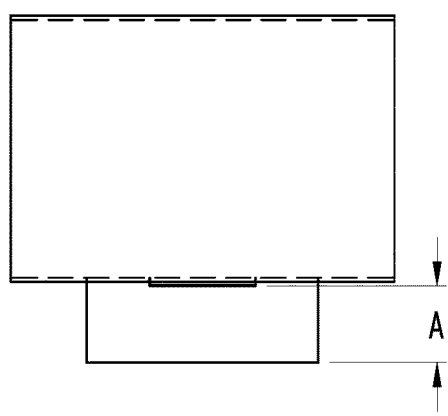
FIG. 8 is a top view of the bracket of FIG. 2.

FIGS. 6-8 show the nominal dimensions A-O of one embodiment of bracket 10, which is used in retrofitting the J.T. Eaton "Repeater™" rodent trap. Bracket 10 dimensions A-O in inches are stated in Table 1 below:

TABLE 1

| | Dimension (inches) |
|---|---|
| A | .451 |
| B | 2.250 |
| C | 1.125 |
| D | 1.000 |
| E | .313 Radius |
| F | .100 (2x) |
| G | .445 (2x) |
| H | .625 |

TABLE 1-continued

| | Dimension (inches) |
|---|---|
| I | 1.360 |
| J | 1.656 |
| K | 1.563 |
| L | .500 |
| M | .03 Radius (Typ.) |
| N | .500 |
| O | .024 Stock |

Figure 9:
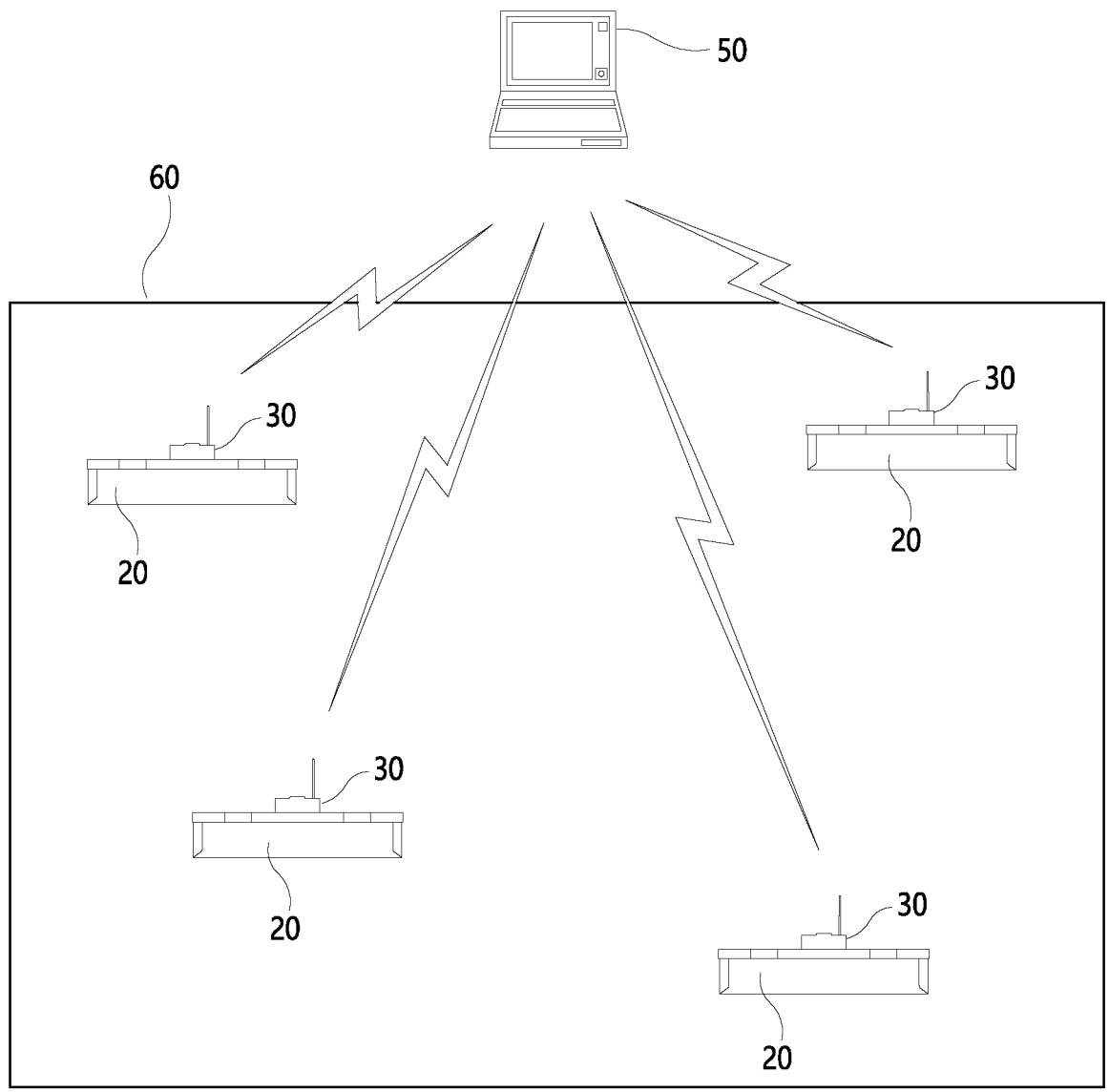
FIG. 9 is a diagram illustrating a series of rodent traps converted for remote monitoring spaced around a user facility in wireless communication with a receiver unit in a remote monitoring system.

FIG. 9 depicts a remotely monitored rodent trap system 40 incorporating a plurality of retrofitted rodent traps 20 spaced at strategic locations throughout a commercial facility 60 in wireless communication with one or more remote monitoring receiver units 50 which may, for example, be a professional pest control entity providing inspection, monitoring and maintenance services. The receiver unit 50 could be a stationary PC, mobile smartphone, or other suitable receiving device that can be conveniently monitored so that visits to the facility 60 by inspection personnel can be optimized based on when alerts are received that one or more traps 20 have captured rodents, and only those traps are visited. System cost and labor savings are achieved resulting in cost savings to customers with older manual trap systems. The system can be used for capture and release, baiting, and kill techniques.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A method of converting a conventional manually monitored capture-and-release rodent trap into a remotely-monitored rodent trap, comprising the steps of:
   providing a conventional manually monitored capture-and-release rodent trap having a box-shaped container with opposed one-way entry corridors communicating with a capture chamber and a removable lid for accessing said capture chamber;
   providing a smart-sensor for remotely monitoring the presence of one or more rodents inside said capture chamber;
   providing a bracket having a rodent opening therein for limiting passage through an open space between said one-way entry corridors;
   attaching said smart-sensor to said rodent trap; retrofitting said bracket to said rodent trap such that said rodent opening in said bracket restricts movement of a rodent into said capture chamber to a pathway in sufficient proximity for detection by said smart sensor of the presence of said rodent in said capture chamber; and wherein said bracket is provided with a downwardly extending lip and said bracket retrofitting step is accomplished by press-fitting said lip into the space between said opposed one-way entry corridors.

2. The method of claim 1 wherein said bracket has a one-piece construction and is formed of sheet metal steel.

3. The method of claim 1 wherein said bracket is formed of 24 gauge galvanized steel.

\* \* \* \* \*

UNITED STATES PATENT AND TRADEMARK OFFICE
CERTIFICATE OF CORRECTION

| | |
|---|---|
| PATENT NO. | : 11,602,144 B2 |
| APPLICATION NO. | : 17/235632 |
| DATED | : March 14, 2023 |
| INVENTOR(S) | : Peter Joseph Mueller |

It is certified that error appears in the above-identified patent and that said Letters Patent is hereby corrected as shown below:

In the Claims

Claim 3, Column 6, Line 32, change, "The method of claim 1" to read, --The method of claim 2--.

Signed and Sealed this
Ninth Day of May, 2023

Katherine Kelly Vidal
*Director of the United States Patent and Trademark Office*